Feb. 7, 1933.  E. B. PERRINE  1,896,369
AUTOMATIC FISHING REEL BRAKE
Filed Dec. 17, 1928
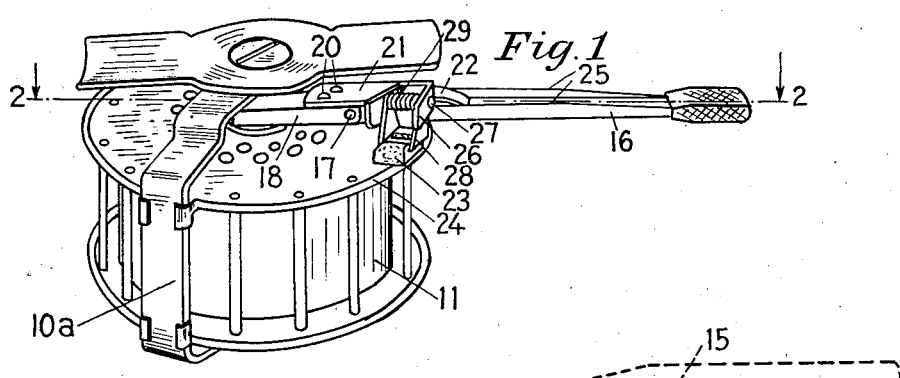
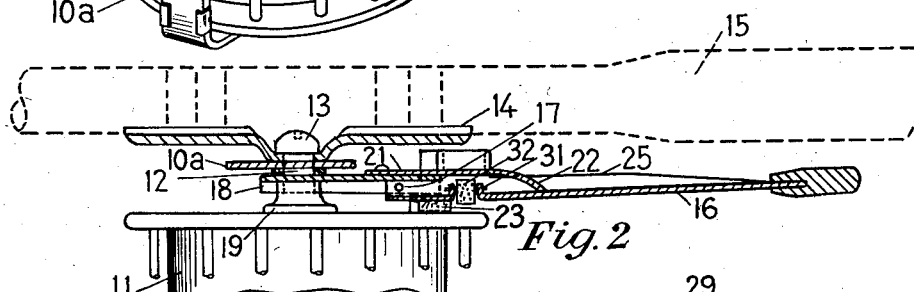
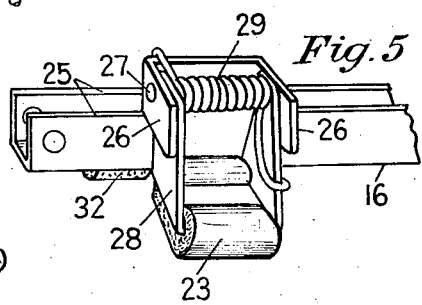
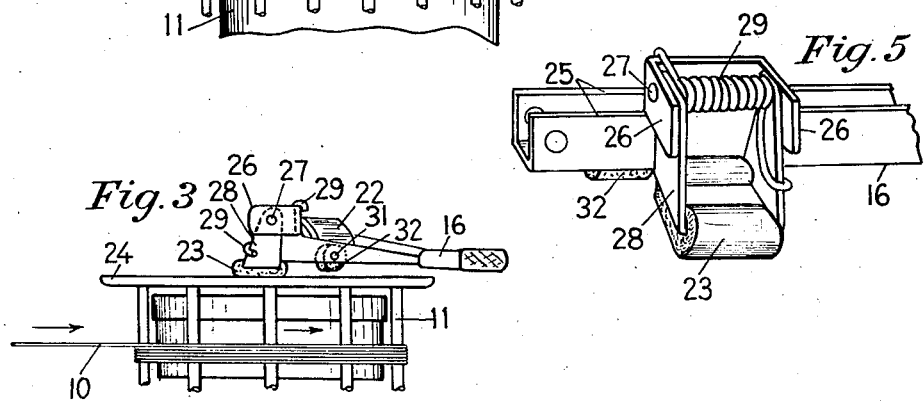
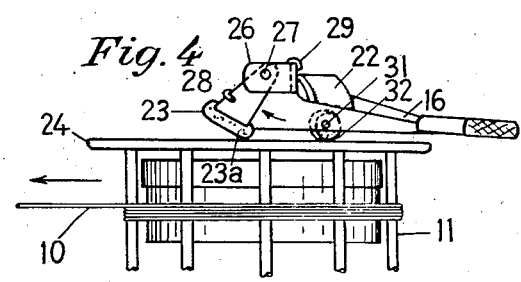
INVENTOR
EMMETT B. PERRINE
BY
Raymond L. Barton
ATTORNEY Patented Feb. 7, 1933

1,896,369

UNITED STATES PATENT OFFICE

EMMETT BURGESS PERRINE, OF LOS ANGELES, CALIFORNIA, ASSIGNOR TO PERRINE MANUFACTURING CO., OF MINNEAPOLIS, MINNESOTA

AUTOMATIC FISHING REEL BRAKE

Application filed December 17, 1928. Serial No. 326,489.

My invention relates in general to automatic fishing reels, in which the line is wound upon a spool by means of a coiled spring under the control of a brake; and my improvements relate especially to a brake which automatically retards, arrests and controls the line spool, when the line is being drawn in under the action of the spring and to allow the line spool to operate free from the brake when playing the line out, thus eliminating the continuous operating of the brake by hand while holding the rod as the line is played out by the other hand.

Another object of the invention is to provide a slight tangential pressure by the heel of the brake shoe under the action of its spring against the line spool whereby to insure immediate retraction of the brake shoe to its full braking position when outward pull on the line ceases.

More specifically, my invention relates to a distinct improvement upon a type of automatic fishing reels now on the market wherein a brake is provided and so arranged as to hold the line spool from turning in either direction until such brake is released by hand pressure.

In order to operate existing automatic reels of this type, it is therefore necessary to exercise considerable skill in handling the line, because the movements of the hand must be in the proper order; i. e., the line must be grasped with the hand which is not engaged in holding the rod; the brake must be released with the same hand that is holding the rod; then the line must be drawn out, the brake being reset whenever the hold on the line is released.

This method of operation must be closely followed. Should the brake be released before grasping the line, the coil spring will wind the line in when it is not desired to do so, and the same thing will happen if the hold on the line is released before the brake is set. Again, if an attempt is made to draw the line out before the brake is released, an unpleasant result is produced. Therefore, in operating the type of fishing reels alluded to, considerable skill and close attention is required and unpleasant results often occur which lessen the pleasure of the sport.

My improvement when applied to fishing reels of the character described obviates the necessity of performing the difficult series of operations which have been mentioned, by constructing a brake which will allow the line spool to be free from braking action as the line is played out and permitting the brake to automatically re-seat itself upon the reverse rotation of the line spool thus keeping the line from being drawn in at such time.

The object of the improvement will be understood by reference to the drawing wherein:

Figure 1 is a perspective view of an automatic fishing reel having my improvement attached thereto.

Figure 2 is a section taken on the line 2—2 of Figure 1.

Figure 3 is a top plan view having a portion of the reel broken away showing the brake fully applied to the line spool.

Figure 4 is a similar view showing the brake in the position which it will assume when the line spool has been slightly rotated from the position of Figure 3 in the direction of the arrow shown in Figure 4.

Figure 5 is a perspective view of a portion of the braking device.

Referring in detail to the drawing 10 designates the line, 10ª the line guide, 11 the line spool and 12 the spool shaft having the screw head 13, which overlies the pole-attaching plate 14 secured in any suitable manner to the pole 15.

Describing now the novel elements, the brake arm 16 is fulcrumed near its inner end on a pin 17, whereby said arm is connected with a supporting arm 18, said arm 18 in turn being apertured to fit upon shaft 12 and being held in fixed relation to said shaft 12 by the annular shoulder 19 and the adjacent portion of the line guide 10ª, which cooperates with said shoulder 19, a clamp thus being formed to grip said arm 18.

To the outer side of arm 18 is secured desirably by means of a pair of rivets 20, a spring arm 21, having a deflected outer end 22 which normally bears against brake lever 16 to yieldingly hold its shoe 23 against the marginal portion of the other end plate 24 of the spool.

As best shown in Figure 5, the brake lever 16 is provided with reinforcing side flanges 25, which extend along each side of the deflected spring end 22. Said lever 16 is also provided with cooperating ears 26 struck up from one of its flanges to pivotally support upon a pin 27 a saddle 28 to which brake shoe 23 is attached. Rat-trap spring 29 coiled about pin 27 tends to move the saddle 28 to the position shown in Figure 3 wherein the brake is fully applied.

Brake arm 16 at the point where it overlies the marginal portion of the spool plate 24, is provided with ears 30 to support a pin 31 upon which is pivoted a roller 32. When the line is being drawn out as indicated in Figure 4, the heel 23ᵃ of the brake shoe 23 is the only part of said shoe that engages the marginal portion of the end plate 24 and this engagement is under the slight force of spring 29.

This causes the roller 32, under the action of spring 22 to engage under slight pressure with said plate 24, thus limiting the movement of lever 16 toward spool 11. In the position of the parts shown in Figure 3, the roller 32 is held entirely out of contact with the line spool plate 24 by reason of the brake shoe 23 being in the fully applied position.

In this specification, and the accompanying drawing, I have described and shown a preferred form of my invention and specifically mentioned certain of its more important objects. I do not limit myself to the forms disclosed, since various changes and adaptations may be made therein, without departing from the essence of my invention as hereinafter claimed; and objects and advantages, other than those specifically mentioned, are included within its scope.

I claim:

1. In a fishing reel, the combination of a support adapted to be attached to a fishing rod, a rotary spring drum for a fishline mounted on said support, a hand-operable brake lever attached to said support, a brake shoe carried by said lever normally engaging said drum, and means for movably mounting said shoe on said lever whereby the braking pressure of the shoe on the drum is reduced when the line is drawn out.

2. In a fishing reel, the combination of a support adapted to be attached to a fishing rod, a rotary spring drum for a fishline mounted on said support, a hand-operable brake lever attached to said support, a brake shoe carried by said lever normally engaging said drum, and means for pivoting said shoe on said lever whereby the braking pressure of the shoe on the drum is reduced when the line is drawn out.

3. In a fishing reel, the combination of a support adapted to be attached to a fishing rod, a rotary spring drum for a fishline mounted on said support, a hand-operable brake lever attached to said support, a stirrup pivotally mounted on said lever, and a brake shoe carried by said stirrup normally engaging said drum, said pivotal mounting causing the braking pressure of the shoe on the drum to be reduced when the line is drawn out.

4. In a fishing reel, the combination of a support adapted to be attached to a fishing rod, a rotary spring drum for a fishline mounted on said support, a hand-operable brake lever attached to said support, a brake shoe carried by said lever normally engaging said drum, a roller carried by said lever to limit the movement of the lever toward said drum, and means for movably mounting said shoe on said lever whereby the braking pressure of the shoe on the drum is reduced when the line is drawn out.

5. In a fishing reel, the combination of a support adapted to be attached to a fishing rod, a rotary spring drum for a fishline mounted on said support, a hand-operable brake lever attached to said support, a stirrup pivotally mounted on said lever, a brake shoe carried by said stirrup normally engaging said drum, said pivotal mounting causing the braking pressure of the shoe on the drum to be reduced when the line is drawn out, and a roller carried by said lever to limit the movement of the lever toward the drum when said shoe is swung from its engaged position with said drum.

6. In a fishing reel, the combination of a support adapted to be attached to a fishing rod, a rotary spring drum for a fishline mounted on said support, a hand-operable brake lever attached to said support, a brake shoe carried by said lever and normally exerting a pressure against said drum, and means for connecting said shoe with said lever whereby the braking pressure of the shoe on the drum is reduced when the line is drawn out.

7. In a fishing reel, the combination of a support adapted to be attached to a fishing rod, a rotary spring drum for a fishline mounted on said support, a brake mounted to move in a single plane only and normally exerting a braking pressure in said plane opposing rotation of said drum, the said pressure being reduced when said drum rotates in the direction opposite to that in which it is driven by its spring, and hand-operable means for removing the braking effect of said brake to permit the line to be wound up by said spring drum.

8. In a fishing reel, the combination of a support adapted to be attached to a fishing rod, a rotary spring drum for a fishline mounted on said support, a brake pivotally mounted to move in a single plane only and normally exerting a braking pressure in said plane opposing rotation of said drum, the radial distance from the pivotal point of said brake to the point of its braking contact varying as the pressure of said brake is reduced and applied, and hand-operable means for removing the braking effect of said brake to permit the line to be wound up by said spring drum.

9. In a fishing reel, the combination of a support adapted to be attached to a fishing rod, a rotary spring drum for a fishline mounted on said support, a brake pivotally mounted to move in a single plane only and normally exerting a braking pressure in said plane opposing rotation of said drum in the direction to wind the line thereon, the radial distance from the pivotal point of said brake to the point of its braking contact decreasing as the line is drawn out, and hand-operable means for removing the braking effect of said brake to permit the line to be wound up by said spring drum.

10. In a fishing reel, the combination of a support adapted to be attached to a fishing rod, a rotary spring drum for a fishline mounted on said support, a brake pivotally mounted to move in a single plane only and normally exerting a braking pressure in said plane opposing rotation of said drum in the direction to wind the line thereon, the braking surface of said brake being eccentric with relation to its pivotal point whereby the braking pressure is reduced as the line is drawn out, and hand-operable means for removing the braking effect of said brake to permit the line to be wound up by said spring drum.

EMMETT BURGESS PERRINE.